United States Patent

Kobayashi et al.

[15] 3,701,942
[45] Oct. 31, 1972

[54] ATTACHABLE TEST DEVICE FOR A FLASH DEVICE

[72] Inventors: Tatsuo Kobayashi; Yoshiharu Ota, both of Kawanishi, Japan

[73] Assignee: Minolta Camera Kabushiki Kaisha, Osaka, Japan

[22] Filed: March 13, 1970

[21] Appl. No.: 19,326

[30] Foreign Application Priority Data

March 17, 1969 Japan .....................44/20289

[52] U.S. Cl. .....................324/51, 95/11 L, 324/20 R
[51] Int. Cl. .....................G01r 31/02, G01r 31/22
[58] Field of Search...........324/51, 29.5, 133, 20, 51; 315/120, 129; 95/10, 11 L; 73/5; 340/252

[56] References Cited

UNITED STATES PATENTS

| | | | |
|---|---|---|---|
| 2,901,692 | 8/1959 | Polhemus | 324/51 |
| 2,581,497 | 1/1952 | Podell | 315/120 X |
| 2,475,104 | 7/1949 | McGall | 73/5 |
| 2,543,860 | 3/1951 | Lovi et al. | 73/5 |
| 2,625,863 | 1/1953 | Kirwin | 324/51 X |
| 3,200,720 | 8/1965 | Drasch | 324/29.5 X |
| 3,140,422 | 7/1964 | McGee | 340/252 X |

Primary Examiner—Gerard R. Strecker
Attorney—Watson, Cole, Grindle & Watson

[57] ABSTRACT

A photographic camera provided with a circuit composed of an indicating lamp connected to one of a pair of terminals on the camera which terminals are connectable respectively to synchro-terminals of a flash device. A shunting condenser is connected in parallel with the indicating lamp, and a circuit having a resistance and a manually operative test switch in series, in parallel with a synchronizing switch is connected between the other of the pair of terminals and the indicating lamp and condenser. Thereby, all the flash circuits including a flash tube, the flash device, the synchro-terminals of the flash device and the camera and the electrical connection therebetween may be tested by means of the indicating lamp by the closing of the test switch.

3 Claims, 2 Drawing Figures

INVENTOR
Tatsuo Kobayashi
Yoshiharu Ota
BY
Watson, Cole, Grindle & Watson
ATTORNEY

ATTACHABLE TEST DEVICE FOR A FLASH DEVICE

BACKGROUND OF THE INVENTION

In the prior art the causes of failure in flash photography are generally taken to be, first, a defect of the flash bulb itself due to disconnection of a filament secondly, consumption of a battery on the power source side of the flash device or a fault of the condenser and thirdly, bad contact between the flash bulb and the socket of the flash device. However, besides the above failures, there are also causes due to, for example, disconnection of a synchro-cord for connecting the flash device to the camera, bad contact due to an imperfect connection between the synchro-plug at the end of the synchro-cord and the synchro-terminal of the camera which comprise a large percentage of the causes for the failures and especially in flash photography making use of an electronic flash tube the above causes comprise almost all of the failures.

However, in the prior art a test device independent of the camera, has been provided in the flash device, by which a test of the flash circuit only in the flash device has been carried out. Therefore, troubles due to the above first to third causes can be detected, however, it is impossible to make a test of the connection between the flash device and the camera. Further, the entire flash circuit including that within the inside of the camera, such as the above-mentioned disconnection of a synchro-cord. and an imperfect connection between the synchro-plug and the synchro-terminal, and especially in circuits using an electronic flash tube, the tests thereof are scarcely carried out at the present time.

SUMMARY OF THE INVENTION

In the present invention the photographic camera is provided with an indicating lamp connected to one of a pair of terminals on the camera and connectable to the synchro-terminals of a flash device. A shunting condenser is connected in parallel with the indicating lamp. A manually operative test switch is connected in series to a resistor in parallel with a synchronizing switch, which in turn is connected in series between the circuit composed of the indicating lamp and the condenser and the other terminal of the camera. Thereby, tests can be made of all the flash circuits of a flash tube, including the flash device, the synchro-terminals of the flash device, the camera, and the connections therebetween.

The primary object of the present invention is to permit a camera to test the lighting possibility of a flash device using either a flash lamp or an electronic flash tube when any one of them is provided on the camera.

The second object of the present invention is to provide a test device for a flash device contained in a camera, which permits the camera to simultaneously test the flash circuit in the flash device and the flash circuit in the connection portion between the flash device and the camera, and all of the flash circuits in the camera.

DESCRIPTION OF THE PREFERRED EMBODIMENT

Figure 1:
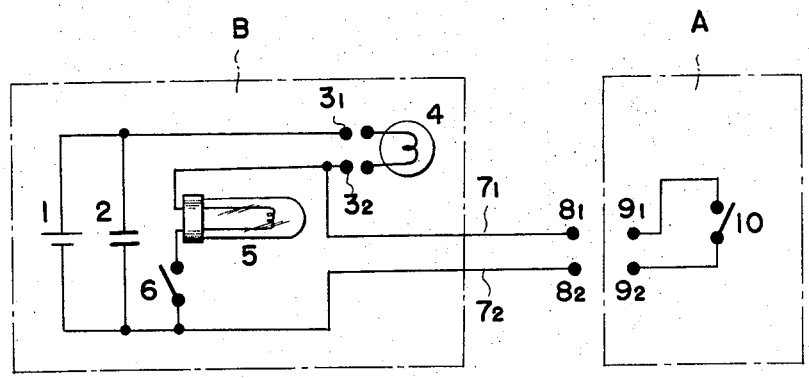
FIG. 1 is a circuit diagram of an example of a test device provided on the flash device well known in the prior art, wherein A shows the circuit in the camera and B shows the circuit in the flash device.

A test device for the flash device in the prior art is contained in the flash device B as shown in FIG. 1 wherein electrodes of the power source charging circuit composed of battery 1 and condenser 2 are connected by sockets $3_1$, $3_2$ for connecting flash tube 4, indicating lamp 5 and test switch 6 in series. The electrodes and flash lamp are connected to synchronizing switch 10 in the camera or the shutter through synchro-cords $7_1$, $7_2$ and synchro-plugs $8_1$, $8_2$, connectable respectively to synchro-terminals $9_1$, $9_2$ provided on the camera body in parallel with indicating lamp 5 and test switch 6.

Figure 2:
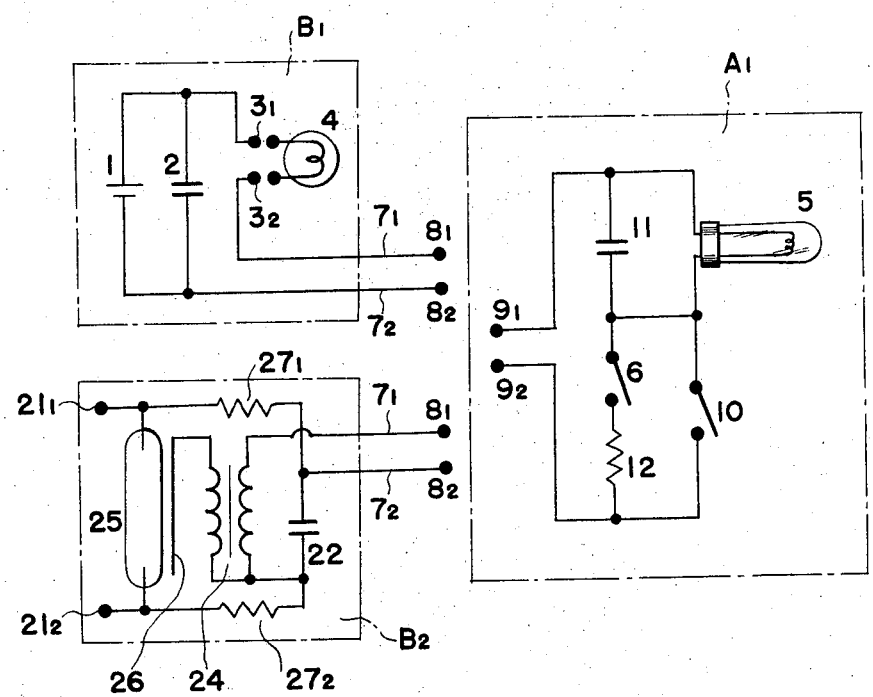
FIG. 2 is a circuit diagram of an embodiment in accordance with the present invention, wherein A shows the circuit in the camera, $B_1$ shows the circuit in the flash device making use of a flash lamp, and $B_2$ shows the circuit in the flash device making use of an electronic flash tube.

Meanwhile, in the present invention, as shown in FIG. 2, to one terminal $9_1$ of synchro-terminals $9_1$, $9_2$ the parallel-connected portion composed of indicating lamp 5 and condenser 11, and another parallel portion composed of test switch 6 and set resistance 12—connected in series to each other—and synchro-switch 10 are connected in series, and connected to the other terminal $9_2$ of the synchro-terminals, and all of them are contained in camera body $A_1$ as a test device.

Further, in flash device $B_1$ with flash lamp 4, as shown in FIG. 2 one electrode of the power source comprising battery 1 and condenser 2 is connected to one electrode $8_1$ of the synchro-plug formed on the end portion of synchro-cord $7_1$ through flash lamp socket $3_1$, and the other electrode $8_2$ is connected to the other electrode of the power source. Synchro-plugs $8_1$, $8_2$ are arranged to connect respectively to synchro-terminals $9_1$, $9_2$ of the camera. Therefore, by fitting flash lamp 4 in flash lamp socket $3_1$, $3_2$ and connecting synchro-plugs $8_1$, $8_2$ with synchro-terminals $9_1$, $9_2$ respectively, and then closing test switch 6 on camera body $A_2$, the charge on condenser 2 flows through flash lamp 4, shynchro-cord $7_1$, synchro-plug $8_1$, synchro-terminal $9_1$, indicating lamp 5, test switch 6, set resistance 12, synchro-terminal $9_2$, synchro-plug $8_2$, and shynchro-cord $7_2$. In this case, if flash lamp 4 has no disconnection and is fitted properly in sockets $3_1$, $3_2$, indicating lamp 5 is lit as long as synchro-cords $7_1$, $7_2$ have no disconnection and synchro-plugs $8_1$, $8_2$ are connected properly to synchro-terminals $9_1$, $9_2$ respectively.

And in this case, while being charged by condenser 11, indicating lamp 5 requires a slight delay to reach its normal brightness, however, that delay is very short and a brief moment after test switch 6 is closed test lamp 5 is at its normal brightness. Set resistance 12 is provided to control the electric current so as not to light flash lamp 4 even though test switch 6 is closed.

In this manner, the lighting of the indicating lamp indicates that everything is all right in the circuits of flash device $B_1$, including synchro-cords $7_1$, $7_2$, the connection of synchro-plugs $8_1$, $8_2$ and synchro-terminals $9_1$, $9_2$. Therefore, in taking a flash photograph, when synchronizing switch 10 is closed, the charging current to condenser 2 and the current of battery 1 flow from flash lamp 4 through condenser 11, test lamp 5 and closing synchronizing switch 10, and accordingly flash lamp 4 is lit.

And, in flash device $B_2$, having an electronic flash tube, power source terminals $21_1$, $22_2$ are connected to electronic flash tube 25, and to trigger condenser 22 through resistances $27_1$, $27_2$ in parallel. One end of trigger condenser 22 is connected to one electrode $8_1$ of the synchro-plugs through primary winding of boosting transformer 24 and synchro-cord $7_1$. The other electrode $8_2$ of the synchro-plugs is connected to the other end of trigger condenser 22 through synchro-cord $7_2$, and the secondary winding of boosting transformer 24 is connected to trigger electrode 26 of flash discharge tube 25.

Therefore, by connecting synchro-plugs $8_1$, $8_2$ to synchro-terminals $9_1$, $9_2$ respectively of the camera body $A_1$ in FIG. 2 and connecting power source terminal $21_1$, $21_2$ to a relatively high voltage power source, and then closing test switch 6, condenser 22 is discharged through the primary winding of boosting transformer 24, condenser 11, switch 6, and set resistance 12. A high voltage is generated in the secondary winding of boosting transformer 24 so that flash discharge tube 25 is triggered to emit light. Therefore, an indication is provided that the flash device is fitted properly in the camera, and thereafter by closing synchronizing switch 10 it is possible to take a flash photograph without fail.

We claim:

1. A circuit for testing the condition of a flash circuit in a camera having a pair of synchronizing terminals connectable to a source for igniting a flash device, comprising:

a housing including terminals connected to said synchronizing terminals with said housing attached to said camera;

an indicating lamp;

a condenser shunted across said indicating lamp for by-passing the discharge current of said source;

a resistance and a manually operative test switch connected in series with one another and in series with said condenser, said resistor, test switch and condenser are parallelly connected across said terminals; and a synchronizing switch connected in series with said indicating lamp and in parallel with said test switch and said resistor, and with said manually operative test switch closed said indicating lamp is operative to indicate the continuity of said flash circuit and with said synchronizing switch closed the current through said flash device is sufficient for ignition.

2. A circuit as in claim 1 wherein said source comprises a charged condenser, said flash device is an attachable flash bulb connected to one pole of said charged condenser and to one of said synchronizing terminals and the continuity of said flash circuit is determined with said manually operative test switch closed and said synchronizing switch open.

3. A circuit as in claim 1 wherein said source comprises a booster transformer including a primary winding connected in parallel with a second condenser across said synchronizing terminals, a trigger electrode connected to the secondary winding of said booster transformer, and said flash device is an electronic flash tube and the continuity of said flash circuit and said flash tube is determined with said manually operative test switch open and said synchronizing switch closed.

* * * * *